United States Patent
Bookbinder et al.

(10) Patent No.: US 7,534,733 B2
(45) Date of Patent: *May 19, 2009

(54) SYNTHETIC SILICA GLASS OPTICAL MATERIAL HAVING HIGH RESISTANCE TO LASER INDUCED DAMAGE

(75) Inventors: Dana Craig Bookbinder, Corning, NY (US); Richard Michael Fiacco, Corning, NY (US); Kenneth Edward Hrdina, Horseheads, NY (US); Lisa Anne Moore, Corning, NY (US); Susan Lee Schiefelbein, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 665 days.

This patent is subject to a terminal disclaimer.

(21) Appl. No.: 11/064,341

(22) Filed: Feb. 22, 2005

(65) Prior Publication Data

US 2005/0187092 A1 Aug. 25, 2005

Related U.S. Application Data

(60) Provisional application No. 60/547,304, filed on Feb. 23, 2004, provisional application No. 60/640,777, filed on Dec. 31, 2004.

(51) Int. Cl.
*C03C 3/06* (2006.01)
*C03B 19/00* (2006.01)
*C03B 37/00* (2006.01)

(52) U.S. Cl. .................................... 501/54; 65/17.6
(58) Field of Classification Search ............. 501/54
See application file for complete search history.

(56) References Cited

U.S. PATENT DOCUMENTS

| | | | | |
|---|---|---|---|---|
| 5,410,428 | A | 4/1995 | Yamagata et al. | 359/350 |
| 5,668,067 | A | 9/1997 | Araujo et al. | 359/350 |
| 6,143,676 | A * | 11/2000 | Ohashi et al. | 501/54 |
| 6,451,719 | B1 | 9/2002 | Yamagata | |
| 6,576,578 | B1 | 6/2003 | Ikuta et al. | 501/54 |
| 2003/0051507 | A1 | 3/2003 | Ikuta et al. | 65/30.1 |
| 2003/0115904 | A1 | 6/2003 | Kuhn et al. | 65/17.6 |

FOREIGN PATENT DOCUMENTS

| | | |
|---|---|---|
| EP | 0401845 | 12/1990 |
| EP | 0483752 | 5/1992 |
| EP | 0545196 | 6/1993 |
| EP | 1340722 | 9/2003 |
| JP | 05058667 A | 3/1993 |

(Continued)

*Primary Examiner*—Jerry Lorengo
*Assistant Examiner*—Kevin M Johnson
(74) *Attorney, Agent, or Firm*—Robert P. Santandrea; Timothy M. Schaeberle (57) ABSTRACT

Disclosed is a synthetic silica glass optical material having high resistance to optical damage by ultraviolet radiation in the ultraviolet wavelength range, particularly in the wavelength less than about 250 nm and particularly, exhibiting a low laser induced wavefront distortion; specifically a laser induced wavefront distortion, measured at 633 nm, of between about −1.0 and 1.0 nm/cm when subjected to 10 billion pulses of a laser operating at approximately 193 nm and at a fluence of approximately 70 μJ/cm$^2$. The synthetic silica glass optical material of the present invention comprises OH concentration levels of less than about 600 ppm, preferably less than 200 ppm, and H$_2$ concentration levels less than about $5.0 \times 10^{17}$ molecules/cm$^3$, and preferably less than about $2.0 \times 10^{17}$ molecules/cm$^3$.

29 Claims, 6 Drawing Sheets

FOREIGN PATENT DOCUMENTS

| | | | |
|---|---|---|---|
| JP | 06-199539 A * | 7/1994 |
| JP | 08091867 A | 4/1996 |
| JP | 08133753 A | 5/1996 |
| JP | 11001331 A | 1/1999 |
| JP | 11240728 A | 1/1999 |
| JP | 09235134 A | 9/1999 |
| JP | 11322352 A | 11/1999 |
| JP | 2000143259 A | 5/2000 |
| JP | 2001048571 A | 2/2001 |
| JP | 2001302275 A | 10/2001 |
| JP | 2002053331 A | 2/2002 |
| WO | WO2000/015570 A1 | 3/2000 |

* cited by examiner

SYNTHETIC SILICA GLASS OPTICAL MATERIAL HAVING HIGH RESISTANCE TO LASER INDUCED DAMAGE

CROSS-REFERENCE TO RELATED APPLICATIONS

The present invention claims priority of U.S. Provisional Patent Application Ser. No. 60/547,304, entitled "SYNTHETIC SILICA GLASS OPTICAL HAVING HIGH RESISTANCE TO LASER INDUCED DAMAGE," filed on Feb. 23, 2004, and U.S. Provisional Patent Application Ser. No. 60/640,777, entitled "SYNTHETIC SILICA GLASS OPTICAL HAVING HIGH RESISTANCE TO LASER INDUCED DAMAGE," filed on Dec. 31, 2004, the contents of which are relied upon and incorporated herein by reference in their entirety.

FIELD OF THE INVENTION

The present invention relates to high purity synthetic or fused silica material and the process of making the same. In particular, the present invention relates to high purity synthetic or fused silica optical materials and optical members exhibiting improved resistance to laser induced damage. The present invention is useful, for example, in producing high purity synthetic or fused silica materials for optical members used in applications operating in deep and vacuum UV regions.

BACKGROUND OF THE INVENTION

As practiced commercially, fused silica optical members such as lenses, prisms, filters, photomasks, reflectors, etalon plates and windows, are typically manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, utilizing manufacturing steps that may include, but are not limited to, cutting, polishing, and/or coating pieces of glass from a blank. Many of these optical members are used in various apparatus employed in environments where they are exposed to ultraviolet light having a wavelength of about 360 nm or less, for example, an excimer laser beam or some other ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

As the energy and pulse rate of lasers increase, the optical members which are used in conjunction with such lasers, are exposed to increased levels of laser radiation. Fused silica members have become widely used as the manufacturing material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength excimer lasers operating in the UV and deep UV (DUV) wavelength ranges, which includes lasers operating at about 193 nm and 248 nm wavelengths. Excimer laser systems are popular in microlithography applications, and the shortened wavelengths allow for increased line densities in the manufacturing of integrated circuits and microchips, which enables the manufacture of circuits having decreased feature sizes. A direct physical consequence of shorter wavelengths (higher frequencies) is higher photon energies in the beam due to the fact that each individual photon is of higher energy. In such excimer laser systems, fused silica optics are exposed to high energy photon irradiation levels for prolonged periods of time resulting in the degradation of the optical properties of the optical members.

It is known that such laser induced degradation adversely affects the optical properties and performance of the fused silica optics by decreasing light transmission levels, discoloring the glass, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, are susceptible to laser damage to various degrees.

A common suggestion has been to increase the OH content of such glass to a high level. For example, Escher, G. C., *KrF Laser Induced Color Centers In Commercial Fused Silicas*, SPIE Vol. 998, Excimer Beam Applications, pp. 30-37 (1988), confirms that defect generation rate is dependent upon the fused silica OH content, and that "wet" silica is the material of choice for KrF applications. Specifically, they note that high OH content silica is more damage resistant than low OH silica.

U.S. Pat. No. 5,086,352 and the related U.S. Pat. No. 5,325,230 have also disclosed that the ability to resist optical deterioration from exposure to a short wavelength ultraviolet laser beam depends on the OH group content in the presence of hydrogen gas. Specifically, these references show that for high purity silica glass having low OH content, KrF excimer laser durability is poor. Thus, they suggest an OH content of at least 50 ppm. Similarly, Yamagata, S., *Improvement of Excimer Laser Durability of Silica Glass*, Transactions of the Materials Research Society of Japan, Vol. 8, pp. 82-96 (1992), discloses the effect of dissolved hydrogen on fluorescence emission behavior and the degradation of transmission under irradiation of KrF excimer laser for high purity silica glass containing OH groups to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., *Mechanism of Color Center Destruction in Hydrogen Impregnated Radiation Resistant Glasses*, Materials Research Bull., Vol. 5, pp. 385-390 (1970), have disclosed that hydrogen-impregnated glasses tend to resist gamma ray-induced radiation. Japanese Patent Abstract 40-10228 discloses a process by which quartz glass article made by melting, is heated at about 400 to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950 to 1400° C. followed by heat treatment in an oxygen atmosphere at the same temperature range.

Shelby, J. E., *Radiation Effects in Hydrogen-impregnated Vitreous Silica*, J. Applied Physics, Vol. 50, No. 5, pp. 3702-06 (1979), suggests that irradiation of hydrogen-impregnated vitreous silica suppresses the formation of optical defects, but that hydrogen impregnation also results in the formation of large quantities of bound hydroxyl and hydride, and also results in the expansion or decrease in density of the glass.

Recently, U.S. Pat. No. 5,410,428 disclosed a method of preventing induced optical degradation by a complicated combination of treatment processes and compositional manipulations of the fused silica members to achieve a particular hydrogen concentration and refractive index, in order to improve resistance to UV laser light degradation. It is suggested that under such UV irradiation the chemical bonding between silicon and oxygen in the network structure of the fused silica is generally broken and then rejoins with other structures resulting in an increased local density and an increased local refractive index of the fused silica at the target area.

More recently, U.S. Pat. No.5,616,159 to Araujo et al., disclosed a high purity fused silica having high resistance to optical damage up to $10^7$ pulses (350 mJ/cm$^2$/pulse) at the laser wavelength of 248 nm and a method for making such glass. The composition disclosed in Araujo et al. comprises at least 50 ppm OH and $H_2$ concentrations of greater then $1 \times 10^{18}$ molecules/cm$^3$.

While the above suggested methods are at least partially effective in reducing the absorption induced at 215 and 260 nm, there has been little or no suggestion for addressing optical damage caused by radiation-induced compaction or expansion resulting from prolonged exposure to eximer lasers. And given the semiconductor industry's reliance on excimer lasers and materials that transmit that energy to make integrated circuit chips and other products and the constant drive towards decreased line width and the necessary wavelength of the incident light and the resultant increase in the laser energy level, it follows that the fused silica material requirements become much more stringent. As such, there continues to be a need for more improved fused silica glasses, particularly fused silica material which is as inert as possible with respect to the incident light energy and thus exhibiting increased resistance to optical damage during prolonged exposure to ultraviolet laser radiation, in particular, resistance to optical damage associated with prolonged exposure to UV radiation caused by 193 and 248 nm excimer lasers.

Accordingly, it is the object of the present invention to disclose a method of increasing the resistance of high purity fused silica glass to optical damage caused by laser induced compaction or expansion during use.

SUMMARY OF THE INVENTION

The invention relates to synthetic or fused silica glass optical materials. As used herein, the term "synthetic or fused silica glass optical material" includes the boule or the bulk piece of fused silica produced in a furnace, performs, blanks cut from a boule or preform, and fused silica optical members manufactured from blanks of synthetic fused silica. The production of fused silica optical members may involve finishing steps including, but not limited to cutting, grinding, polishing and/or coating the piece of fused silica glass.

According to one embodiment of the present invention, synthetic silica glass optical materials are provided having high resistance to optical damage by ultraviolet radiation in the ultraviolet wavelength range, particularly in the wavelength less than about 250 nm. The laser induced wavefront distortion, measured at 633 nm, exhibited by the present synthetic silica glass optical materials is between –1.0 and 1.0 nm/cm when subjected to 10 billion pulses of a laser at approximately 193 nm operating at a fluence of approximately 70 µJ/cm$^2$; preferably between –0.1 and 1.0 nm/cm. In another embodiment the synthetic silica glass optical material exhibits a laser induced wavefront distortion, measured at 633 nm, of between about –0.5 and 0.5 nm/cm when subjected to 10 billion pulses of a laser at approximately 193 nm operating at a fluence of approximately 40 µJ/cm$^2$; preferably between about –0.1 and 0.5 nm/cm.

In one embodiment of the invention, the synthetic silica glass optical material of the present invention has a $H_2$ concentration of less than about $5.0 \times 10^{17}$ molecules/cm$^3$ and an OH concentration of less than about 600 ppm; preferably a $H_2$ concentration of less than about $2.0 \times 10^{17}$. According to another embodiment, the synthetic silica glass optical material for use has a $H_2$ concentration ranging between about 0.1 to $2.0 \times 10^{17}$ molecules/cm$^3$, an OH concentration less than about 125 ppm. A still further embodiment of the synthetic silica glass optical material has a $H_2$ concentration ranging between about 0.4 to $1.0 \times 10^{17}$ molecules/cm$^3$ and an OH concentration less than about 600 ppm.

The synthetic silica glass optical material of the present invention enables the production of lens systems for use in photolithographic equipment exhibiting reduced levels of laser induced wavefront distortion within the fused or synthetic silica glass lenses incorporated in the lens systems.

Additional advantages of the invention will be set forth in the following detailed description. It is to be understood that both the foregoing general description and the following detailed description are exemplary and are intended to provide further explanation of the invention as claimed.

DETAILED DESCRIPTION OF THE INVENTION

It is well known in the art that synthetic fused silica is subject to the phenomenon of "compaction" which occurs during or after exposure to laser light of high energy density. This effect leads to a local increase in density and ensuing increase in refractive index and thus causes deterioration of the optical properties of the optical component. Additionally, it is also known that the opposite effect may also occur, i.e. when an optical quartz glass component is exposed to laser light of low energy density but high pulse number. Expansion has been observed under these conditions to be accompanied by an ensuing decrease in refractive index. Regardless of the phenomenon which occurs this laser damage causes the optical properties to deteriorate and thus limit the serviceable life of an optical component.

The present invention provides a synthetic quartz glass optical material for transmission of ultraviolet radiation of a wavelength of 250 nm or shorter that shows a low/reduced degree of laser induced damage. The synthetic silica glass optical material of the present invention is made from ultra-high purity synthetic silica glass and possesses the following composition which is tailored to exhibit this optimized laser damage resistance. Particularly, the inventive synthetic silica glass optical material comprises a $H_2$ concentration level of less than about $5.0 \times 10^{17}$ molecules/$cm^3$ and an OH concentration of less than about 600 ppm. It is however preferred that the $H_2$ concentration exhibited by the synthetic silica glass is less than about $2.0 \times 10^{17}$ molecules/$cm^3$. The increased resistance to laser damage of the inventive synthetic silica glass optical material is evidenced by a laser induced wavefront distortion (hereinafter LIWFD), measured at 633 nm, of between about −1.0 and 1.0 nm/cm when subjected to 10 billion pulses of a laser operating at a fluence of approximately 70μJ/$cm^2$ and a pulse length ranging between about 25-35 ns/pulse. Preferably the LIWFD exhibited by the synthetic silica glass optical material is between about −1.0 to 1 mn/cm when subjected to at least 10 billion pulses, and more preferably 20 billion pulses, of a laser operating at approximately 193 nm and at a fluence of approximately 70 μJ/$cm^2$, and a pulse length ranging between about 25-35 ns. In a still further embodiment the synthetic silica glass exhibits a LIWFD, measured at 633 nm, of between about −0.5 and 0.5 nm/cm when subjected to 10 billion pulses of a laser operating at approximately 193 nm and at a fluence of approximately 40 μJ/$cm^2$ and a pulse length ranging between about 25-35 ns; more preferably the synthetic silica glass exhibits a LIWFD, measured at 633 nm, of between about −0.1 and 0.5 nm/cm.

In another, preferred embodiment, the synthetic silica glass optical material exhibits a $H_2$ concentration which ranges between about 0.4 to $2.0 \times 10^{17}$ molecules/$cm^3$ and an OH concentration of less than about 200 ppm, and more preferably between about 0.1 to 200 ppm.

In a still further embodiment, the synthetic silica glass optical material exhibits a $H_2$ concentration range of between about 0.1 to $1.0 \times 10^{17}$ molecules/$cm^3$ and an OH concentration of less than about 125 ppm; preferably a range between about 0.1 to 100 ppm, and more preferably between about 0.1 to 50 ppm.

While not intending to be limited by theory it is known that OH does not negatively impact transmission at 193 nm at levels up to about 1300 ppm, however the inventors have surprisingly discovered that lower levels of OH do favorably affect the LIWFD.

Figure 1:
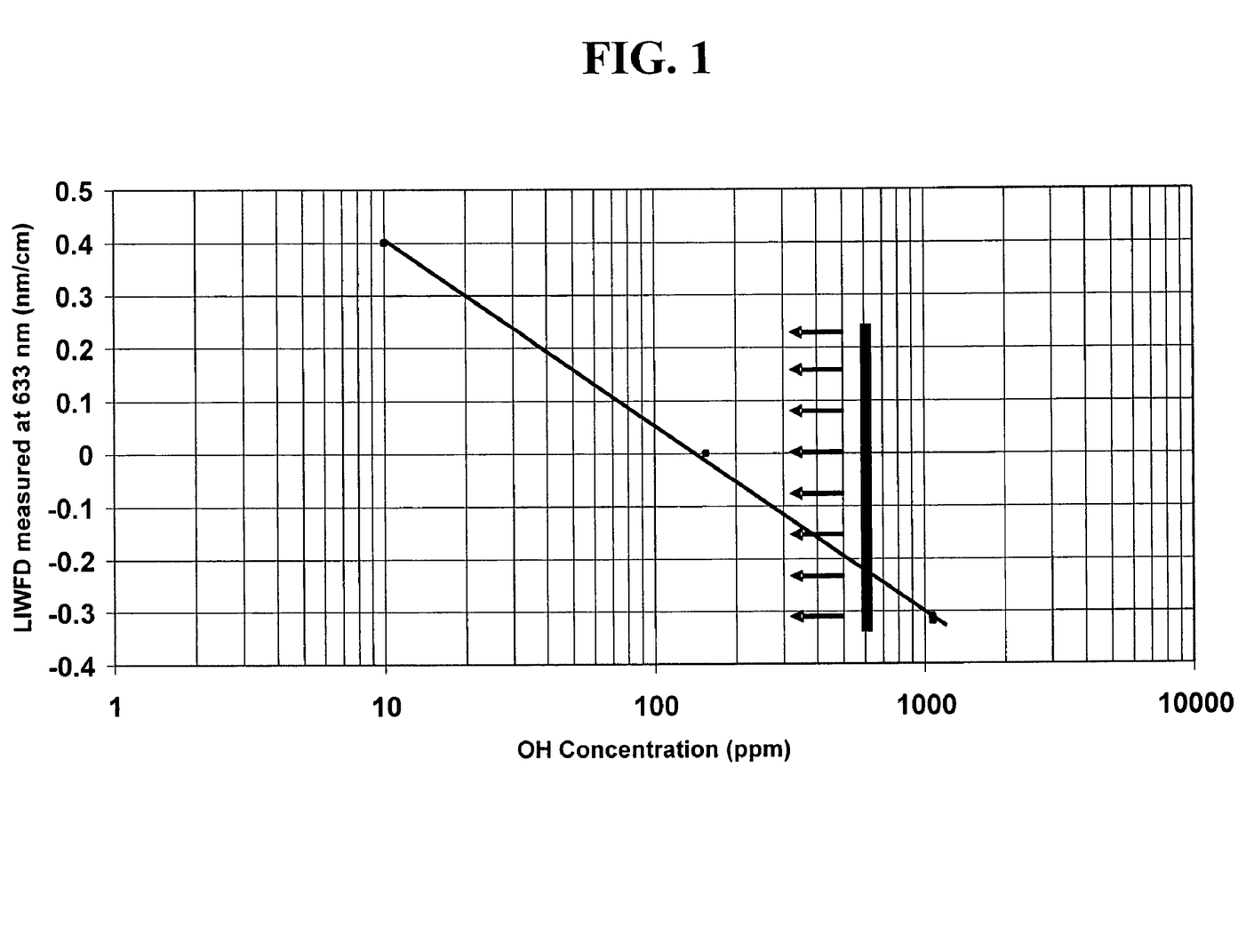
FIG. 1 is a graph illustrating the effect that varying levels of OH concentration levels has on the laser induced wavefront distortion at approximately 193 nm for synthetic silica optical materials.

In order to investigate and demonstrate the above effect the inventors formulated a series of synthetic silica glass optical material examples by methods familiar to those skilled in the art. Specifically, three fused silica samples having OH concentration of 10,150 and approximately 1000 ppm OH, respectively, were subjected to a fixed pulse count of 10 billion pulses of a laser operating at 40 μJ/$cm^2$ fluence and the data was plotted, as illustrated in FIG. 1 to form a "best fit" line illustrating the relationship of varying OH concentration versus laser induced wavefront distortion. An examination of FIG. 1 illustrates this correlation between low OH concentration and a reduction in the LIWFD. The "best fit line" data in FIG. 1 reveals that in order to obtain an acceptable/minimum amount of LIWFD, the inventive synthetic silica glass optical material should contain an OH concentration of less than about 600 ppm. Based on the premise that it is desirable to have the synthetic silica glass optical material exhibit a laser resistance behavior in which the LIWFD, after 10 billion pulses of a laser operating at approximately 193 nm and at a fluence of approximately 40 μj/$cm^2$, is between −1.0 and 1.0 nm/cm, a preferred OH concentration is less than 200 ppm, and more preferably less than 120 ppm. An OH concentration ranging between 0.1 and 100 ppm is most preferred.

The OH concentration, as measured in OH amount in ppm by weight, for the inventive fused silica was determined in the following manner; in particular it was derived from the measurement of infrared transmittance of the glass and thus derived utilizing the β-OH parameter. The wavelength range of interest is 2-5 μm (wave number range 5000 $cm^{-1}$ to 2000 $cm^{-1}$). A conventional infrared spectrophotometer, either an FT-IR (Fourier transform infrared) spectrometer or a dispersive infrared spectrophotometer, may be employed. For high spatial resolution measurements, such as for variation of OH concentration, additional equipment may be used as is known in the art.

The OH group has characteristic absorption bands near 2.72 μm (3676 $cm^{-1}$), 2.21 μm (4525 $cm^{-1}$) and 1.38 μm (7246 $cm^{-1}$) in fused silica.

The parameter β-OH is defined as the relative linear absorption coefficient of hydroxyl (OH) in a glass matrix, or the absorption per unit path length. It is calculated using the following equation:

$$\beta\text{-OH} = \frac{1}{t}\log\frac{T_{ref}}{T_{OH}}$$

where:
$T_{ref}$=Transmittance of sample at reference position, a non-absorbing wavelength such as 4000 $cm^{-1}$;
$T_{OH}$=Transmittance of sample at OH absorption peak (~3676 $cm^{-1}$ for silica); and
t=Thickness of sample (mm).

This β-OH value is linearly proportional to the hydroxyl concentration.

The OH concentration, c, in mol.$liter^{-1}$, is derived from the Beers-Lambert Law $$A = \epsilon \cdot c \cdot b$$

where the absorbance A=log($T_{ref}/T_{OH}$), ε is the molar absorptivity in liter.$mol^{-1}$.$cm^{-1}$, c is concentration in mol.$liter^{-1}$, and b is the path length (sample thickness) in cm.

$$c(\text{mol.liter}^{-1}) = A/(\epsilon \cdot b)$$

Concentration of OH in ppm by weight can thus be calculated from c in mol.$liter^{-1}$ using the density of the glass and molecular weight of OH (~17 g/mol). The constant ε for high purity silica glass at a particular wavelength is available in the prior art.

It is known to those skilled in the art that an amount of $H_2$ is needed in synthetic fused silica optical material so as to minimize the amount of laser induced damage, however the inventors have discovered that only small levels of $H_2$, less than $5.0 \times 10^{17}$ molecules/$cm^3$, are, in fact necessary, and are thus preferred; preferably less than $2.0 \times 10^{17}$ molecules/cm$^3$. That being said, the measurement of hydrogen molecule concentration was carried out in the following manner. Raman spectrometry was carried out using a JY Horiba T64000 spectrometer with an EEV charge-coupled device (CCD) detector. The hydrogen molecule concentration [molecules/cm$^3$] was obtained from the ratio of the intensity detected from the hydrogen molecule scattering peak at 4135 cm$^{-1}$ (I 4135 ) to the intensity of the silica scattering peak at 800 cm$^{-1}$ (I 800 ), i.e. I 4135/I 800, in the laser Raman spectrum (V. S. Khotimchenko(^) et al., Zhumal Prikladnoi Spektroskopii, 46 (6), 987-997 (1986)). More specifically, the intensities of the peaks were determined by integrating the areas under the peaks using a linear or quadratic fit to the background. It should be noted that in the present method, the limit of detection was $1 \times 10^{16}$ molecules/cm$^3$.

Figure 2:
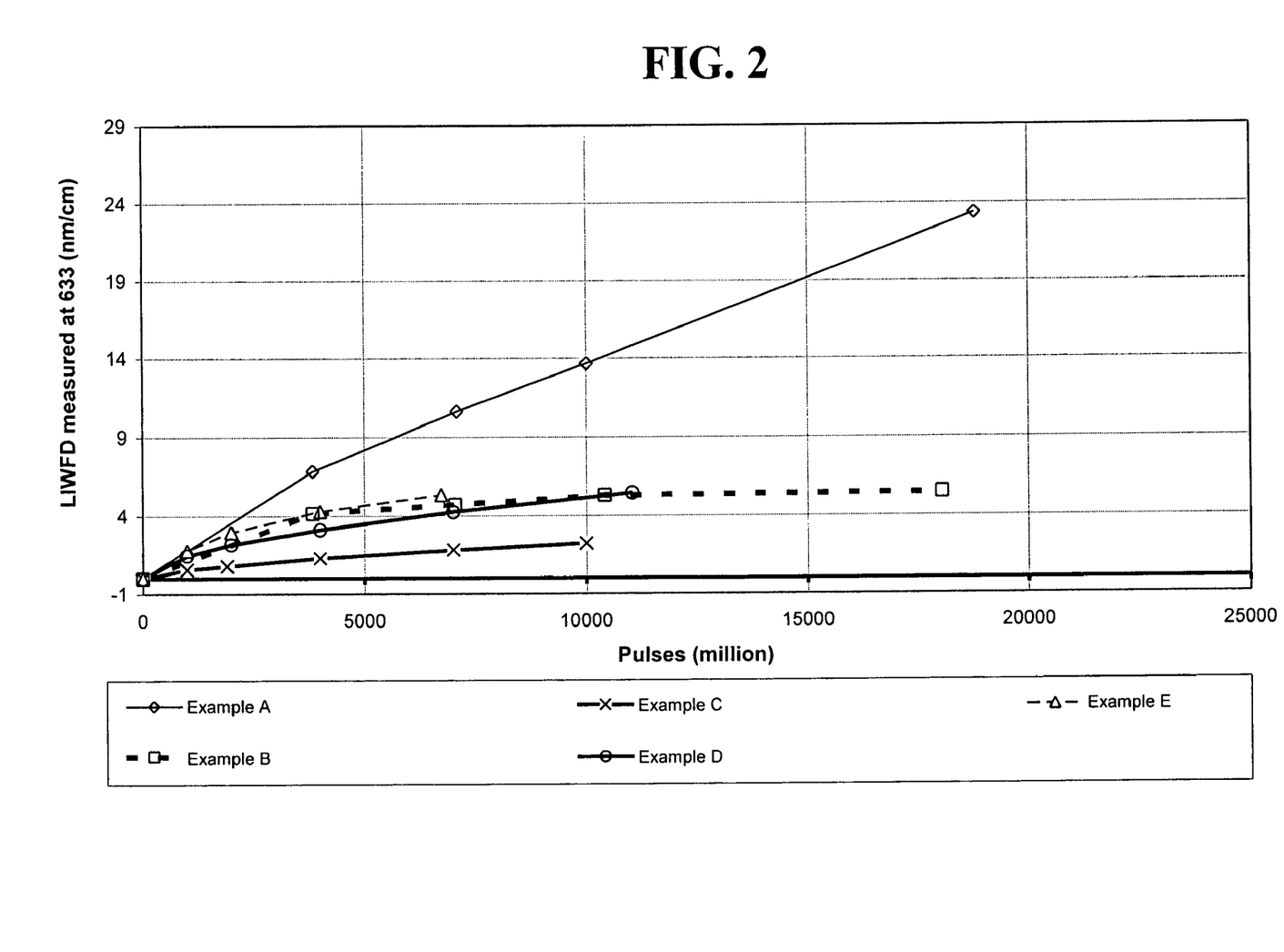
FIG. 2 is a graph illustrating the relationship between the wavefront distortion and the laser pulse number at approximately 193 nm at various radiation fluences for a series of silica optical materials exhibiting $H_2$ levels, below current detection limits, and various OH concentrations.

Referring now to FIG. 2, illustrated is the LIWFD (measured at 633 nm) as a function of laser (operating at approximately 193 nm) pulse number at various fluences for five different synthetic silica glass optical materials (Examples A-E); the graph shows the wavefront distortion (Y-axis) in fractions of the wavelength of the incident measuring light (633 nm) versus the number of exposure pulses (X-axis). In particular, the wavefront distortion measured being a result of the incident, level wavefront being disturbed by spatial inhomogeneities of the refractive index and differing light path length. Each of the five samples were formulated by standard fused silica methods known to those skilled in the art, with each sample exhibiting H$_2$ molecule concentration below current detection limits and each of the five samples illustrated exhibiting a different OH concentration, as detailed in Table I. Each of the samples was subject to a 193 nm pulsed laser operating at a constant fluence as also detailed in Table I. An examination of FIG. 2 reveals that these samples, exhibiting a H$_2$ concentration which is below current detection limits, exhibit a less than desirable compaction behavior; specifically a LIWFD measured at 633 nm in excess of 2 nm/cm when subjected to 10 billion pulses of a laser operating at about 193 nm and at a fluence of approximately 70 μJ/cm$^2$. The inventors thus surmised from this behavior that some minimum amount of H$_2$ is needed to minimize LIWFD.

TABLE I

| Example | OH Concentration (ppm wt.) | Fluence (μJ/cm$^2$/pulse) |
| --- | --- | --- |
| Example A | 10 | 70 |
| Example B | 1200 | 70 |
| Example C | ~150 | 40 |
| Example D | ~300 | 70 |
| Example E | ~1200 | 40 |

An infrared array detector was used to image a large area encompassing the laser irradiated portion of an inventive fused silica sample; particularly a fused silica sample of the composition and formed in the manner for later described Example 1. Specifically, the sample testing involved subjecting the sample to 30 billion pulses of a laser operating at 70 μJ/cm$^2$. The infrared array image, or OH array map shows/illustrates a hydroxyl or OH profile that does not indicate a tendency towards hydroxyl generation due to laser irradiation. More particularly, the OH profile data suggests that only about 0.3 ppm OH or less was formed in the exposed region during this long term laser exposure. While not intending to be limited by theory, if one assumes that hydrogen would react with SiO$_2$ to form SiOH and SiH, as shown below:

$$H_2 + SiO_2 \rightarrow SiOH + SiH$$

then this would suggest that only $1.1 \times 10^{16}$ molecules/cm$^3$ of hydrogen reacted. This indicates that low hydrogen levels are acceptable for low LIWFD. As described above, between $1 \times 10^{15}$ and $5.0 \times 10^{17}$ molecules/cm$^3$ is acceptable, although the preferred range is between $8.0 \times 10^{15}$ and $2.0 \times 10^{17}$ molecules/cm$^3$. These low levels are also preferred in order to insure that the glass behaves in a purely compacting manner. Unpredictable LIWFD is undesirable and thus, low H$_2$ levels combined with low OH levels, representative of low OH concentration, insure that the LIWFD will be purely compacting in nature. It should be pointed out that minor "expanding" behavior, though not preferred, is acceptable.

TABLE II

| OH Generated (ppm) | H$_2$ Consumed ($\times 10^{17}$ molecules/cm$^3$) |
| --- | --- |
| 0.3 | 0.11 |
| 0.7 | 0.25 |
| 1.0 | 0.39 |

An additional benefit of the preferred low levels of hydrogen, as just mentioned, is that the H$_2$ loading levels that need to be maintained during the consolidation and hydrogen loading step(s) (as later described), remain below those levels at which hydrogen becomes flammable. It is preferred that the H$_2$ loading is conducted below those levels. Obviously, it would be preferred from a production/manufacturing standpoint to operate below these flammability levels. Table III shows results of hydrogen levels in the glass after loading at different partial pressures of hydrogen. Levels of hydrogen in the glass were achieved using non-flammable gases that are sufficient for low LIWFD. Targeted hydrogen levels between $1 \times 10^{15}$ and $5.0 \times 10^{17}$ molecules/cm$^3$ are desired for low LIWFD and are obtainable utilizing non-flammable levels of hydrogen in a safe and low cost process.

TABLE III

| Percent H$_2$ in Atmosphere | Pressure (atm) | H$_2$ in Glass ($10^{17}$ molecules/cm$^3$) |
| --- | --- | --- |
| 4 | 6 | 0.8-1.0 |
| 6 | 1 | 0.1-0.2 |

Note 1
Non Flammable H$_2$ Levels: <6.2% H$_2$ w/balance being N$_2$ or Helium gas phase
Note 2
Atmospheric hydrogen needed to H$_2$ load glass
4% H$_2$/N$_2$ at 70 psi gauge pressure yielded 0.8-1.0 × 10$^{17}$ molecules/cm$^3$ H$_2$ in glasses
6% H$_2$/N$_2$ at atmospheric pressure yielded 0.1-0.2 × 10$^{17}$ molecules/cm$^3$ H$_2$ in glasses It should be noted that the presence of chlorine, alkali metals, alkaline earth metals and transition metals all lead to transmission loss at 193 nm. Therefore, it is desired that chlorine level in the glass is controlled below 50 ppm, and the amount of alkali, alkaline earth and transition metals are all controlled at lower than 10 ppb, preferably lower than 1 ppb.

To date, two major processes are used for the production of high purity synthetic fused silica materials for use in optical applications. They are the soot-to-glass process and the direct-to-glass or "boule" process.

In the soot-to-glass process, silica soot particles are generated in a furnace and allowed to deposit on a rotating surface by, for example, outside vapor deposition (OVD) or vapor axial deposition (VAD), and the like, to form a porous soot preform. The soot preform is subsequently consolidated at a sintering temperature to form transparent consolidated high purity fused or synthetic silica material. These VAD/OVD methods have been used widely in the production of optical fiber preforms and are thus well known to those skilled in the art. The direct-to-glass method usually involves forming silica soot particles at a temperature higher than that of the soot-to-glass method by flame hydrolysis and the like, and the soot particles are deposited onto the surface of a rotating table at such a high temperature (about 1650° C., for example) that they are consolidated into fused silica material in situ, usually in the same furnace where the soot particles are generated.

Soot-to-glass methods for producing high purity synthetic fused silica materials have been described in the prior art before. For example, United States Patent Application Publication No. 2003/0115905 discloses a fused silica blank having a $H_2$ content in the range of $0.1 \times 10^{16}$ to $4.0 \times 10^{16}$ molecules/$cm^3$, an OH content in the range of 125 to 450 ppm by weight, an SiH group content of less than $5 \times 10^{16}$ molecules/$cm^3$, and a refractive index inhomogeneity of less than 2 ppm.

In general, the aforementioned synthetic silica glass optical material, according to the present invention, can be produced by the following soot deposition method:

a) producing a gas stream containing a silicon-containing compound in vapor form capable of being converted through thermal decomposition with oxidation or flame hydrolysis to silica and passing the gas stream into the flame of a combustion burner to form amorphous particles of fused silica soot;

b) depositing the fused silica soot particles onto a support to form a fused silica soot preform;

c) consolidating the soot preform into a transparent glass body; and d) hydrogen loading the glass body by heating the glass body in the presence of an $H_2$-containing gas to a temperature sufficient to result in diffusion of $H_2$ into the glass body.

In step (a) of the process, the soot particles are typically provided by a flame hydrolysis process of a silicon precursor compound. Useful silicon precursor compounds for forming the preform/glass body preferably include any halide-free cyclosiloxane compound, for example, polymethylsiloxane such as hexamethyldisiloxane, polymethylcyclosiloxane, and mixtures of these. Examples of particularly useful polymethylcyclosiloxanes include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula—$[SiO(CH_3)_2]_4$—, is used as the feedstock for the fused silica preform, or in the vapor deposition processes such as used in making high purity fused silica for optical waveguide applications. The silicon precursor compound, such, for example, OMCTS (octamethylcyclotetrasiloxane) and the like, may be introduced into a flame of hydrogen, $CH_4$, and the like, burning with $O_2$, whereby silica soot is formed. Step (a) may be plasma-assisted. Although it is preferred that a halide free compound be utilized in the formation of the soot preform, a chlorine containing compound such as $SiCl_4$ can be utilized, however the use of this type of halide containing compound requires certain extra steps to minimize or eliminate the chlorine species in the final synthetic fused silica optical material.

In step (b), the silica soot may be deposited to form a porous body onto a supporting core cane or a mandrel, such as those in a typical outside vapor deposition (OVD) or a vapor axial deposition (VAD) process. If a mandrel is used, the mandrel is removed after deposition to result in a hollow cylindrical shaped porous soot body before the consolidation in step (c).

Alternatively, the soot preform may be formed in accordance with the teaching of U.S. Pat. No. 6,606,883 to Hrdina et al entitled "Method for Producing Fused Silica and Doped Fused Silica Glass," the content of which is relied upon and incorporated herein by reference in its entirety. According to this patent reference, flat, porous silica soot preforms can be formed by depositing silica soot particles on a planar surface. This preform deposition method is hereinafter referred to as "planar deposition" in the present application. Advantageously, the planar deposition surface rotates and oscillates so that a more homogeneous soot preform body can be produced.

The consolidation (sintering) step (c) is usually carried out in the presence of an inert gas, such as helium and/or argon, as well as $H_2O$ and/or $O_2$. It should be noted that to obtain silica glass having relatively high OH concentration, for example, over 50 ppm, it is desired to consolidate the soot preform in the presence of $H_2O$. As discussed below, if the consolidation is conducted in the presence of $H_2O$, the final OH concentration in the silica glass is partly determined by the partial pressure of $H_2O$ in the consolidation atmosphere. It is not excluded that the consolidation may be carried out in the presence of other gas, such as $H_2$, $O_2$, fluorine-containing compounds, and the like. In a particular embodiment, the consolidation involves placing the soot preform in an inert gas, such as He, Ar and/or $N_2$, -containing furnace at a temperature range of between approximately 900-1100° C. and then heating the soot preform up to temperatures sufficient to cause the soot preform to fully consolidate; approximately at least 1500° C.

Purification of the soot preform can be done using methods known in the art, such as chlorine treatment and the like. As previously mentioned, if the preform is formed by using a chlorine-containing silicon precursor compound, such as $SiCl_4$, or if the preform is purified using chlorine, it may be desired to strip the preform of chlorine before consolidation. Chlorine stripping can be done using various types of gases, including, but not limited to, $O_2$, $H_2O$, fluorine-containing compounds, Br-containing compounds, and the like, and compatible mixtures and combinations thereof.

If chlorine and its compounds are kept out of both the laydown and the consolidation steps (e.g., by the use of Cl-free precursors in laydown and Cl-free purification agents (e.g., $Br_2$, HBr, $Br_2$+CO) in consolidation), the fused silica glass produced from such soot preforms will be free of chlorine. However, if these steps cannot be kept strictly chlorine-free, then a chlorine stripping step must be added before the consolidation in order to produce Cl-free glass.

Following consolidation into a glass body the so-formed glass body is hydrogen loaded by heating the glass body in the presence of an $H_2$-containing gas to temperatures sufficient to allow the $H_2$ to diffuse into the glass in a reasonable length of time. Temperatures above approximately 350° C. are recommended with temperatures between 350-500° C. being preferred, though temperatures as high as 800° C. have been utilized. The samples are then held at the chosen temperature for a time sufficient to allow the hydrogen to diffuse entirely throughout the glass body. Hydrogen partial pressures between 0.01 and 1 atmosphere can be balanced with an inert gas such as nitrogen or argon.

The temperature at which hydrogen loading is carried out has been found to impact the LIWFD for a given OH glass. For low water glasses, particularly an OH less than approximately 200 ppm, the loading temperature should be less than 800° C. and preferably less than 600° C. in order to avoid large compaction behavior (LIWFD).

EXAMPLES

Table IV reports the $H_2$ concentration and the OH concentration for 4 synthetic silica glass optical materials; Examples 1, 2, and 3 being inventive examples and Example 4 being a comparison example. Glass cylinders having a weight over about 5 kg were produced, as detailed below, and thereafter bars cut from the cylinders were then tested for LIWFD by exposing the bars to a pulsed laser operating at approximately 193 nm (LIWFD measured at 633 nm); note the fluence of testing for each of the samples listed in Table IV.

TABLE IV

| Example | $H_2$ Concentration ($\times 10^{17}$ molecules/cm$^3$) | OH Concentration (ppm wt.) | Fluence ($\mu J/cm^2$/pulse) |
|---|---|---|---|
| Example 1 | 2.0 | 10 | 40 |
| Example 2 | 2.0 | 10 | 70 |
| Example 3 | 1.8 | 150 | 40 |
| Example 4 | 1.7 | 1200 | 70 |

Examples 1 and 2

A soot preform was made using octamethyl cyclotetrasiloxane (OMCTS) as a precursor and the OVD process as detailed above. The soot preform was then consolidated by placing it in a furnace at a temperature of 1050° C. for a period of 4 hours; a mixture of He and 2.7% $Cl_2$ gas was flowed into the furnace atmosphere. The $Cl_2$ functioned to strip any impurities, as well as OH, from the glass while the glass was still porous; the 4 hour period served to allow the glass body to reach its thermal equilibrium. Next the consolidation step involved holding the glass body for an additional 15 minute hold at a 1050° C. temperature while a He/3% $O_2$ gas mixture was flowed through the system. The so-formed glass body was then heated (in the same He/3% $O_2$ gas mixture) to 1235° C. at rate of 3.1° C/min, then to 1345° C. at a rate of 0.47° C./min and then to 1490° C. at a rate of 0.42° C./min; the gas comprising a mixture of He with 3% $O_2$, was maintained/produced in such a manner that it was sufficient to enable the so-formed glass body to exhibit the desired OH concentration. The glass body was then cooled to room temperature.

The so-formed glass body was then subject to a hydrogen loading step that involved cutting a cylinder sample of the glass body having an OH concentration of approximately 10 ppm, and thereafter heating the cylinder sample to a temperature of 350° C. and holding the cylinder at this temperature for 33 days and subjecting the cylinder to a $H_2$ atmosphere; particularly an atmosphere containing >4.3% (by volume) $H_2$ gas with the balance being nitrogen, the mixture being pressurized to 70 psig. Once hydrogen loading was completed, the glass cylinder sample was allowed to cool to room temperature.

Example 3

A soot preform was made using octamethyl cyclotetrasiloxane (OMCTS) as a precursor and the OVD process as detailed above. The soot preform was then consolidated by placing it in a furnace at a temperature of 1050° C. for a period of 4 hours; a gas mixture comprising He/2.7% $Cl_2$ was flowed into the furnace atmosphere. The $Cl_2$ functioned to strip any impurities, as well as OH, from the glass while the glass was still porous; the 4 hour period served to allow the glass body to reach its thermal equilibrium. Next, the consolidation involved holding the glass body for an additional 15 minute hold at a 1050° C. temperature while a He/3% $O_2$ gas mixture was flowed through the system; the He/$O_2$ mixture functioning as a means of combusting any residual organics present. The so-formed glass body was then heated to 1235° C. at rate of 3° C./min, then to 1345° C. at a rate of 0.47° C./min and then to 1430° C. at a rate of 0.25° C./min; during the final heating steps (from 1235 to 1430° C.) a gas comprising a mixture of He/$H_2O$ was maintained/produced in a such a manner that it was sufficient to enable the resultant glass body to exhibit the desired OH concentration. The glass body was then cooled to room temperature.

The so-formed glass body was then subject to a hydrogen loading step that involved cutting a cylinder sample of the glass body having an OH concentration of 150 ppm, and thereafter heating the cylinder sample to a temperature of 350° C. and holding the cylinder sample at this temperature for 33 days and subjecting the glass cylinder to a $H_2$ atmosphere;. particularly an atmosphere containing approximately 4% $H_2$ gas (by volume) with the balance being nitrogen, the mixture being pressurized to 100 psig. Once hydrogen loading was completed the glass cylinder sample was allowed to cool to room temperature.

Example 4

A soot preform was made and consolidated according to the procedures detailed for Example 3 above.

The so-formed glass body was then subject to a hydrogen loading step that involved cutting a cylinder sample of the glass body having an OH concentration of 1200 ppm, and thereafter hydrogen loading the glass cylinder in a manner as described above for Example 3.

Figure 3:
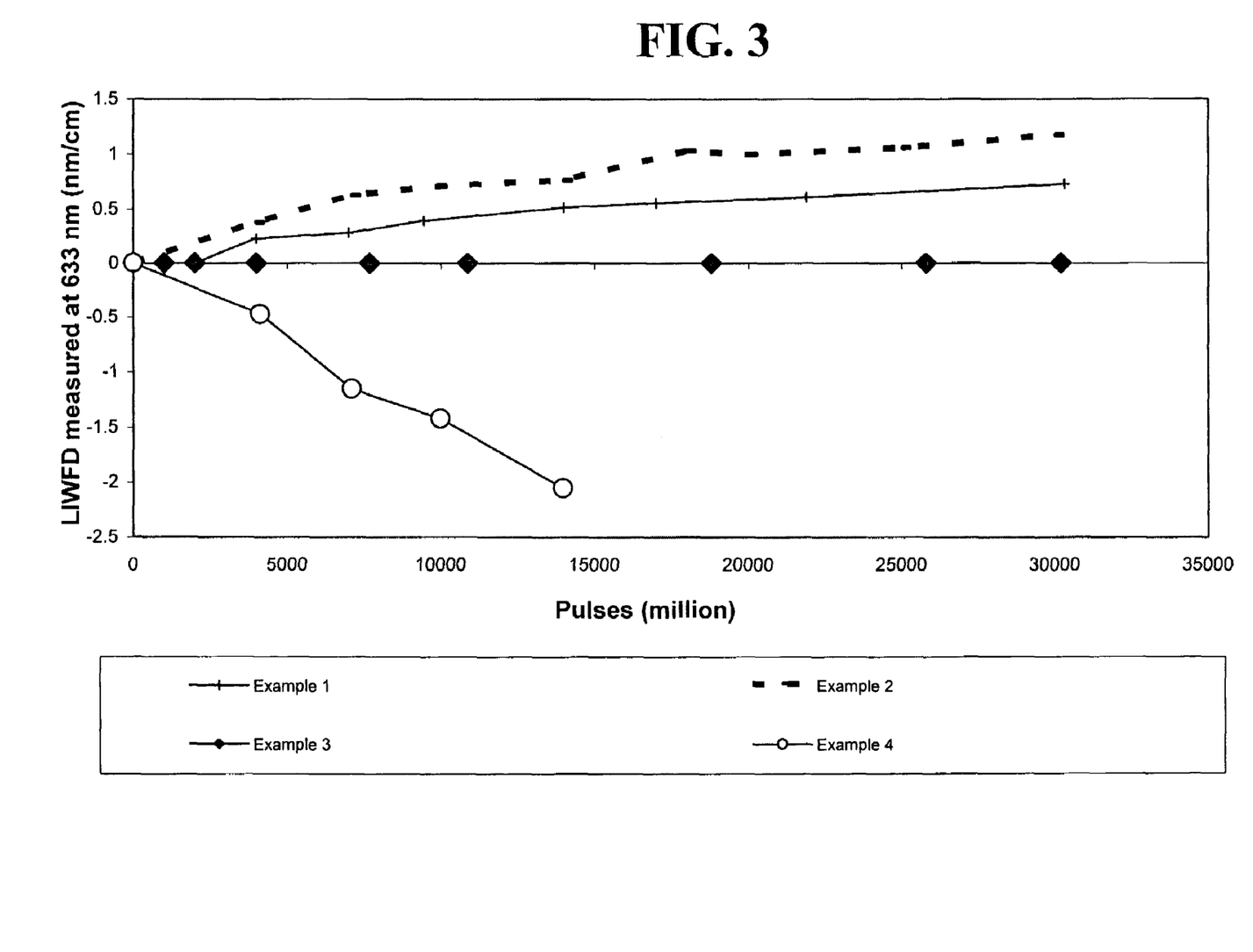
FIG. 3 is a graph illustrating wavefront distortion (measured at 633 nm) as a function of laser pulse number at approximately 193 nm at various different fluences for a number of inventive and comparison synthetic silica optical materials (3 inventive and 1 comparison)

Referring now to FIG. 3 illustrated is the occurrence of laser induced wavefront distortion compaction for the above four synthetic silica glass optical materials exhibiting varying levels of OH (Examples 1-4); in particular the graph shows the wavefront distortion (Y-axis) in fractions of the wavelength of the incident measuring light (633 nm) versus the number of pulses (X-axis). In particular, the wavefront distortion measured being a result of the incident, level wavefront being disturbed by spatial inhomogeneities of the refractive index and changed light path length. As noted above Table IV above also reports the laser fluence that each fused silica glass example was subject to during the LIWFD measurement.

More particularly, the LIWFD measurement above was performed in the following manner. Bars were cut out from the aforementioned cylinder samples and were polished and exposed to 193 nm radiation from an ArF excimer laser along the long direction, particularly a beam exhibiting a 3 mm diameter. The laser was operated at a 4 kHz repetition rate and 100% duty cycle and exhibited a pulselength of about 30 ns (typically 25-35ns). About every 3 to 4 billion pulses the samples were removed from the exposure setup and the laser damage was characterized; in this test by means of 633 nm interferometry which quantified the laser-induced change of optical path length at the 633 nm wavelength. After these mid testing measurements, samples were put back onto the exposure system until the target total pulse count was reached; the total pulse count typically reaching 20 to 30 billion per sample.

An examination of FIG. 3 reveals that the non-inventive high OH-containing Example 4 (1200 ppm OH) exhibited exceedingly poor LIWFD, specifically it exhibited undesirably high expansion behavior.

Table V reports the $H_2$ molecule concentrations and the OH concentration for 9 synthetic silica glass optical materials; including the above-described Example 1. Examples 1, 5, 6, 8, 9 and 12 being representative of the inventive examples and Examples 7, 10 and 11 being representative of the comparison examples. As before, glass blank cylinders having a weight over 5 kg were produced, as detailed below, and were then tested for birefringence and LIWFD upon exposure to 193 nm pulse laser (LIWFD measured at both 193 and 633 nm).

TABLE V

| Example | $H_2$ (×10$^{17}$ molecules/cm$^3$) | OH Concentration (ppm wt.) | Fluence (μJ/cm$^2$/pulse) |
| --- | --- | --- | --- |
| Example 1 | 2.0 | 10 | 70 |
| Example 5 | 0.8 | 100-120 | 40 |
| Example 6 | 1.6 | ~94 | 40 |
| Example 7 | 1.2 | 1134 | 40 |
| Example 8 | 0.76 | ~120 | 40.2 |
| Example 9 | 0.72 | ~94 | 10 |
| Example 10 | 0.5 | 1280 | 40 |
| Example 11 | 0.5 | 100-120 | 40 |
| Example 12 | 0.8 | ~97 | 40 |

Example 5

A soot preform was made using octamethyl cyclotetrasiloxane (OMCTS) as a precursor and the OVD process as detailed above. The soot preform was then consolidated by placing it in a furnace at a temperature of 950° C. for a period of 4 hours; a gas comprising He was flowed into the furnace atmosphere. After the 4 hour soak in the He-containing atmosphere, the atmosphere was converted to a He/3% $O_2$ mixture; with the $O_2$ serving to remove any residual organics which may have been present. The glass body was then allowed to soak in this He/$O_2$ mixture (950° C.) for an additional 3 hours and thereafter, the temperature was ramped to 1235° C. at a rate of 3.1° C./min and then to 1345° C. at a rate of 0.47° C./min and then to 1490° C. at a rate of 0.42° C./min; this He/3% $O_2$ mixture being produced/maintained in a manner such it was sufficient to enable the resultant glass body to exhibit the desired OH concentration. The glass body was then cooled to room temperature.

The so-formed glass body was then subject to a hydrogen loading step that involved cutting a glass cylinder sample of the glass body having an OH concentration of approximately between 100-120 ppm, and thereafter heating the cylinder sample to a temperature of 350° C. and holding the sample at this temperature for 33 days and subjecting the cylinder sample to a $H_2$ atmosphere; particularly an atmosphere containing approximately 4% $H_2$ gas (by volume) with the balance being nitrogen, the mixture being pressurized to 43 psig. Once hydrogen loading was completed the glass cylinder sample was allowed to cool to room temperature.

Example 6

A soot preform was made and consolidated according to the procedures detailed for Example 5. The so-formed glass body was then subject to a hydrogen step that involved cutting a glass cylinder sample exhibiting an average OH concentration of approximately 94 ppm, and thereafter heating the glass cylinder to a temperature of 350° C. and holding the glass cylinder at this temperature for 33 days in a $H_2$-containing atmosphere; particularly an atmosphere containing >4% $H_2$ gas (by volume) with the balance being nitrogen, the mixture being pressurized to 55 psig. Once hydrogen loading was completed the glass cylinder sample was allowed to cool to room temperature.

Example 7

A soot preform was made and consolidated according to the procedures detailed for Example 3 above.

The so-formed glass body was then subject to a hydrogen loading step that involved cutting a glass cylinder sample of the glass body having an OH concentration of 1134 ppm, and thereafter hydrogen loading the glass cylinder in the manner described above for Example 3 to a temperature of 350° C. and holding the cylinder at this temperature for 33 days and subjecting the glass cylinder to a $H_2$ atmosphere; particularly an atmosphere containing approximately 4% $H_2$ gas with the balance being nitrogen pressurized to 100 psig. Once hydrogen loading was completed the glass cylinder sample was allowed to cool to RT.

Example 8

A soot preform was made and consolidated according to the procedures detailed for Example 5 above. The so-formed glass body was thereafter hydrogen loaded in the manner according to the procedures outlined for the example 5 glass body.

Example 9

A soot preform was made and consolidated according to the procedures detailed for Example 5. The so-formed glass body was then subject to a hydrogen loading step that involved cutting a glass cylinder sample exhibiting an average OH concentration of approximately 94 ppm, and thereafter heating the glass cylinder to a temperature of 500° C. and holding the cylinder at his temperature for 7 days in a $H_2$-containing atmosphere; particularly an atmosphere containing 4% $H_2$ gas (by volume) with the balance being nitrogen, the mixture pressurized to 55 psig.

Example 10

A soot preform was made and consolidated according to the procedures detailed for Example 3 above.

The so-formed glass body was subject to a combination annealing and hydrogen loading step that involved cutting a glass cylinder sample exhibiting an average OH concentration of approximately 1280 ppm, and thereafter heating the cylinder to a temperature of 1200° C. at a rate of 10° C./min and holding at this temperature for 10 hours. The glass cylinder was then cooled at a rate of 5° C./Hr to 1100° C. and thereafter held for 116 hours and next cooled at a rate of 5° C./Hr to 900° C. and then cooled at a rate 30° C./Hr to room temperature. The entire annealing/hydrogen loading step was completed in a $H_2$-containing atmosphere; particularly an atmosphere containing 4% $H_2$ gas (by volume) with the balance being nitrogen, the mixture being pressurized to 70 psig.

Example 11

A soot preform was made and consolidated according to the procedures detailed for Example 5. The so-formed glass body was thereafter annealed and hydrogen loaded in a combination step in the manner according to the procedures outlined for the example 10 above.

Example 12

A soot preform was made and consolidated according to the procedures detailed above for Example 5. The so-formed glass body subject to a hydrogen loading step that involved cutting a glass cylinder sample exhibiting an average OH concentration of approximately 97 ppm, and thereafter heating the glass cylinder to a temperature of 500° C. and holding the cylinder at this temperature for 7 days in a $H_2$-containing atmosphere; particularly an atmosphere containing 4% $H_2$ gas (by volume) with the balance being nitrogen, the mixture being pressurized to 55 psig.

Figure 4:
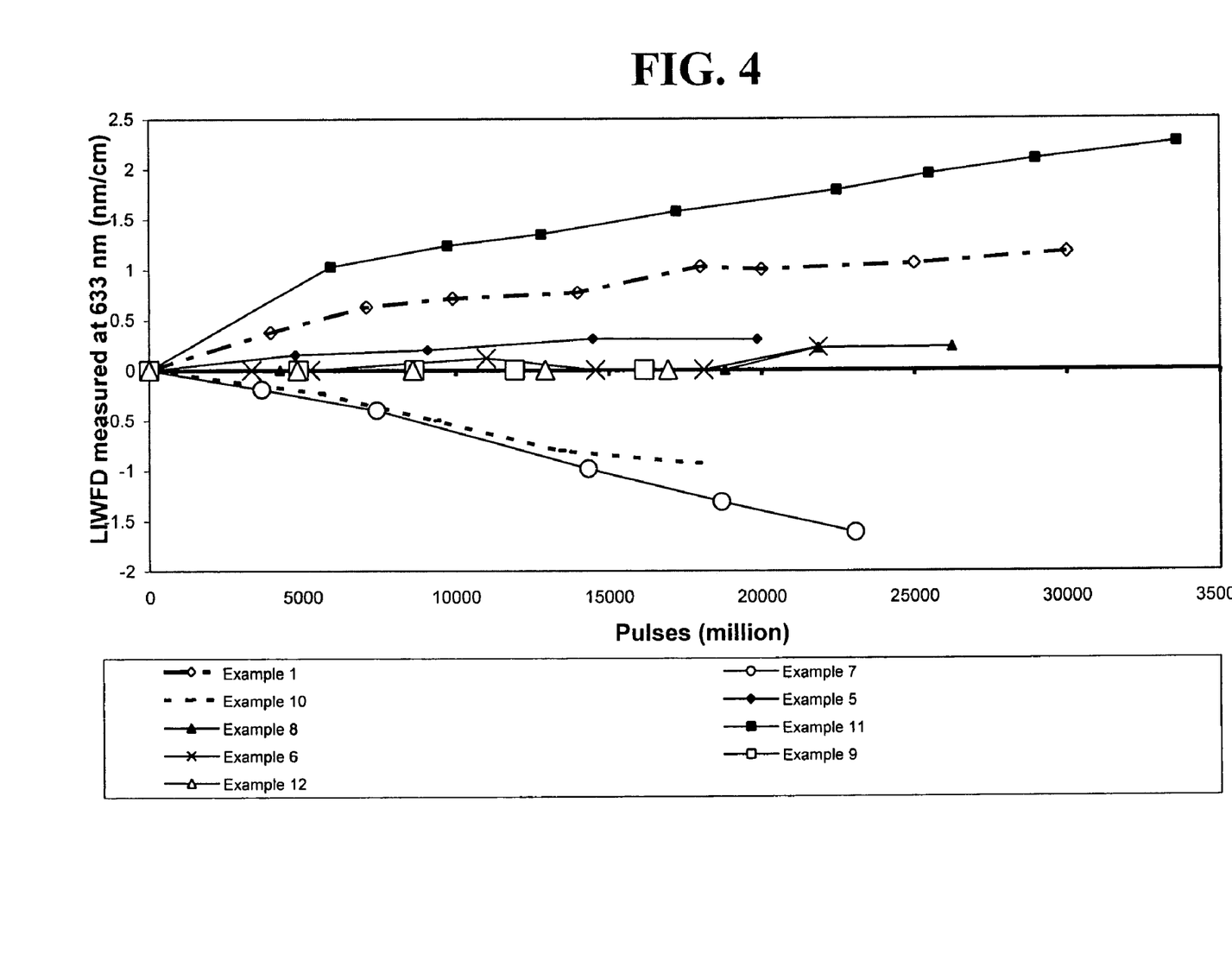
FIG. 4 is a graph illustrating wavefront distortion (measured at 633 nm) as a function of laser pulse number at approximately 193 nm at various different fluences for a number of inventive and comparison synthetic silica optical materials (6 inventive and 3 comparison examples)

Referring now to FIG. 4 illustrated is the occurrence of LIWFD for a series of inventive/comparison synthetic silica glass optical materials; in particular the graph shows the wavefront distortion (Y-axis) in fractions of the wavelength of the incident measuring light (633 nm) versus the number of 193 nm laser pulses (X-axis). Table V above reports the laser's constant fluence that each bar (cut from the glass cylinder sample) was subjected to during the LIWFD testing. The manner of testing was the same as that described above for FIG. 3. Thus, the LIWFD produced by exposure to 193 nm radiation was measured at 633 nm for examples in FIG. 4.

Figure 5:
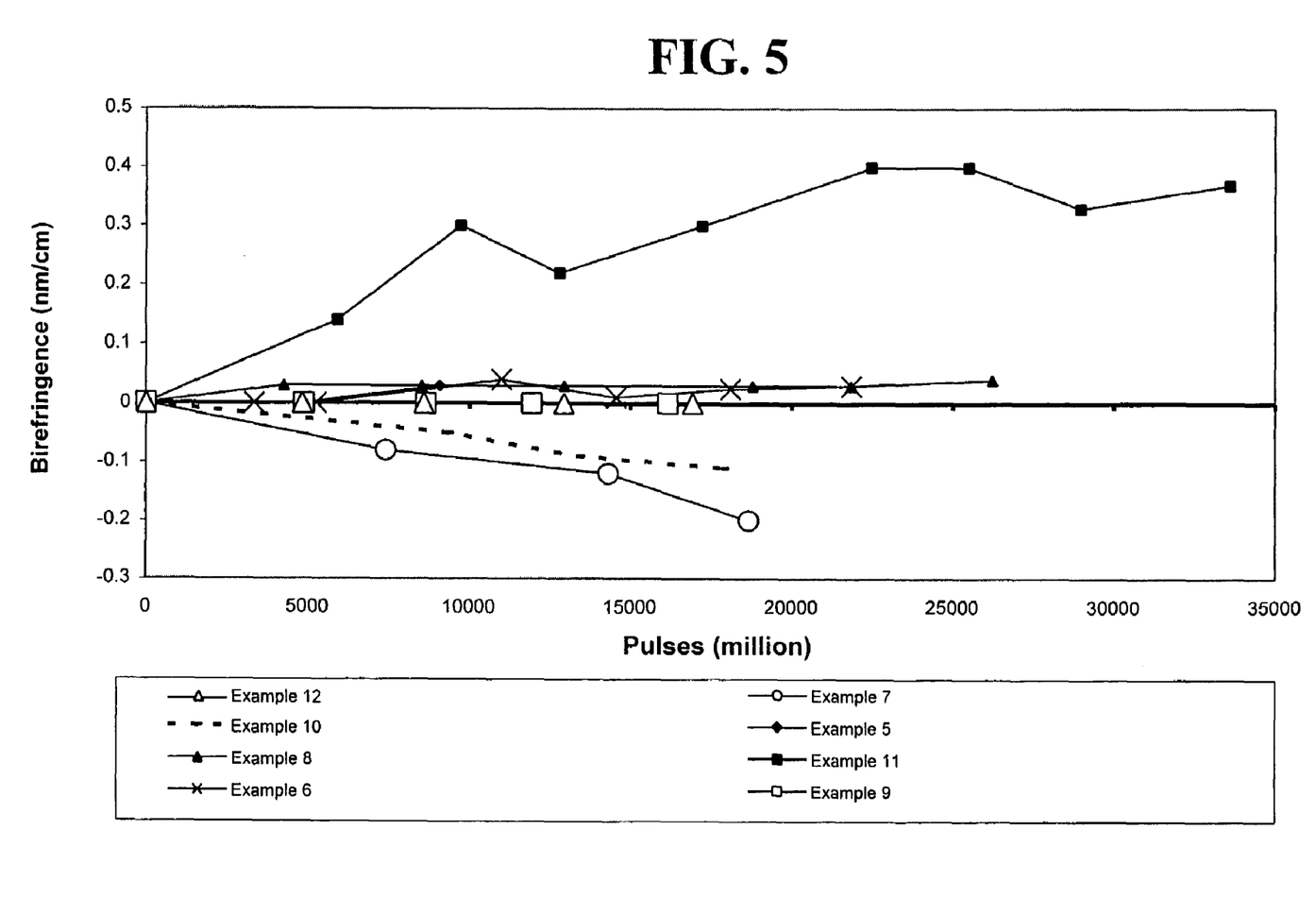
FIG. 5 is a graph illustrating the birefringence as a function of laser pulse number at approximately 193 nm at various different fluences for a number of inventive and comparison synthetic silica optical materials.

Referring now to FIG. 5 illustrated therein is the birefringence as a function of the pulse number of laser pulses at 193 nm for the inventive/comparison synthetic silica optical materials detailed above. The manner of testing was the same as that described above for FIG. 3 except that birefringence was measured utilizing a birefringence measurement system using 633 nm light.

Figure 6:
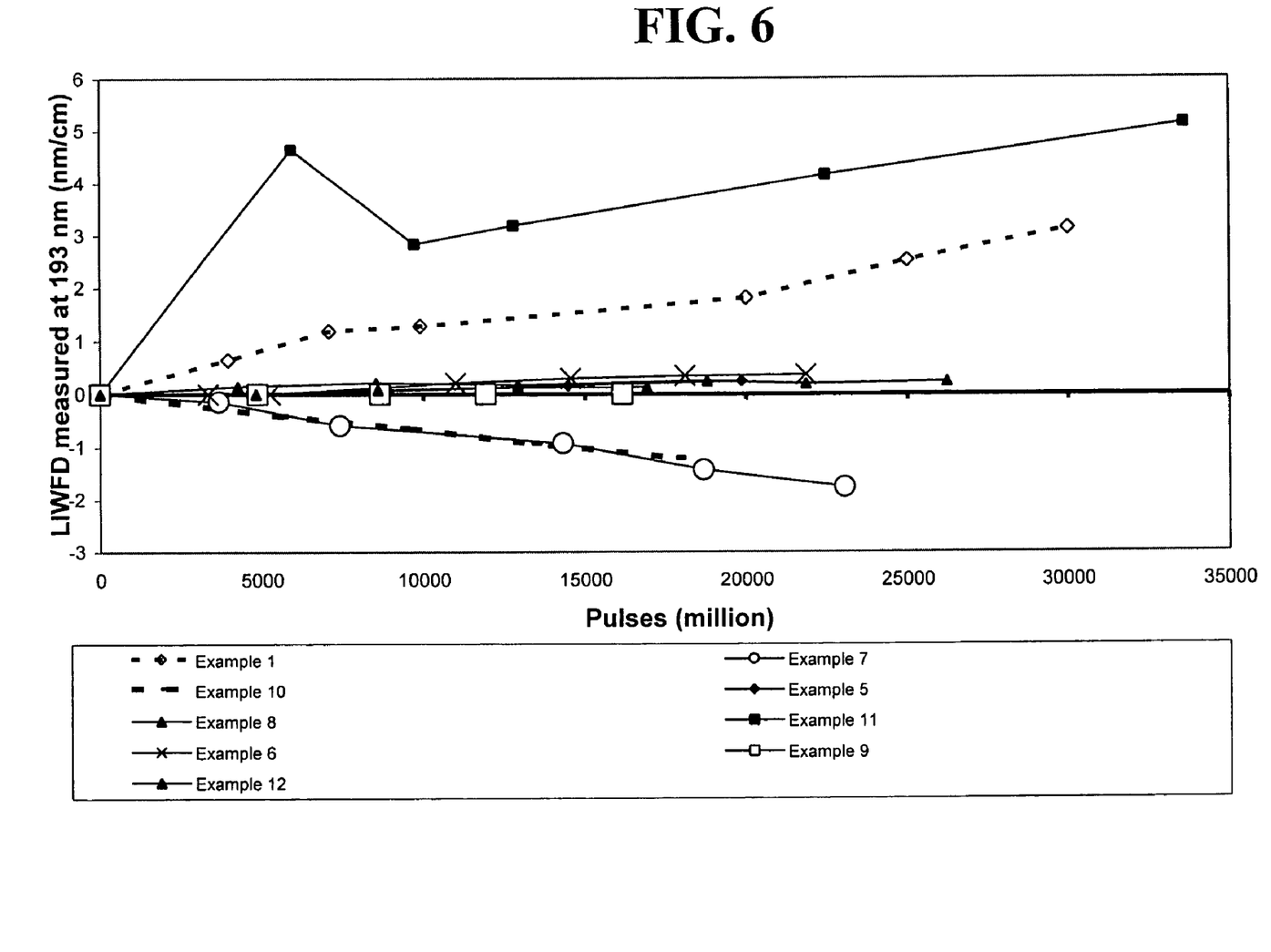
FIG. 6 is a graph illustrating wavefront distortion (measured at 193 nm) as a function of laser pulse number at approximately 193 nm at various different fluences for a number of inventive and comparison synthetic silica optical materials (same 6 inventive and 3 comparison examples as detailed in FIG. 4).

Referring now to FIG. 6 illustrated is LIWFD as a function of the pulse number at approximately 193 nm for a series of inventive/comparison synthetic silica glass optical materials; in particular the graph shows the wavefront distortion (Y-axis) in fractions of the wavelength of the incident measuring light (193 nm) versus the number of pulses at 193 nm (X-axis). The same fluences of 193 nm exposure light in the FIG. 4 test were utilized for the examples in this FIG. 6. However, the thus produced LIWFD was measured at 193 nm instead of 633 nm.

An examination of FIGS. 4-6 reveals that the comparison samples, 7, 10 and 11 each exhibit undesirable LIWFD behavior. Particularly, it should be noted that the two high OH-containing samples, Examples 7 and 10 (1134 and 1280 ppm respectively) exhibit unacceptable LIWFD behavior (excessive expansion). Example 11, on the other hand, exhibits excessive compaction behavior (>1 nm/cm at 10 billion pulses), which is due, in part, to the excessively high temperature (1200° C.) at which the hydrogen loading step was performed at; which is far in excess of the 800° C. (preferably 600° C.) hydrogen loading temperature disclosed above.

Advantages of the inventive synthetic silica optical materials as compared to prior art synthetic silica optical materials include the following: (1) a consistent low laser induced damage behavior, which is desired in fused silica lenses, which in turn leads to improved lens behavior/performance.

It will be apparent to those skilled in the art that various modifications can be made to the present invention without departing from the spirit or scope of the invention. Thus, it is intended that the present invention covers modifications and variations of this invention provided they come within the scope of the appended claims and their equivalents.

What is claimed is:

1. A synthetic silica glass optical material for use, and resistant to optical damage, in the wavelength region of less than 250 nm, the synthetic silica glass optical material consisting essentially of synthetic silica glass, $H_2$, and OH, the synthetic silica glass optical material having a $H_2$ concentration less than about $5.0\times10^{17}$ molecules/cm³, wherein the synthetic silica glass optical material is loaded with $H_2$ at temperature of less than about 600° C., having an OH concentration less than about 600 ppm, and exhibiting a laser induced wavefront distortion, measured at 633 nm, of between −1.0 and 1.0 nm/cm when subjected to 10 billion pulses of a laser operating at approximately 193 nm and at a fluence of approximately 70 µJ/cm².

2. The synthetic silica glass optical material of claim 1, wherein the $H_2$ concentration ranges between about 0.4 to $5.0\times10^{17}$ molecules/cm³ and the OH concentration is less than about 200 ppm.

3. The synthetic silica glass optical material of claim 1, wherein the $H_2$ concentration is less than about $2.0\times10^{17}$ molecules/cm³ and the OH concentration is less than about 200 ppm.

4. The synthetic silica glass optical material of claim 3, wherein the OH concentration ranges between about 30 to 200 ppm.

5. The synthetic silica glass optical material of claim 1, wherein the $H_2$ concentration ranges between about 0.1 to $2.0\times10^{17}$ molecules/cm³ and the OH concentration is less than about 125 ppm.

6. The synthetic silica glass optical material of claim 5, wherein the OH concentration ranges between about 50 to 100 ppm.

7. The synthetic silica glass optical material of claim 3, wherein the OH concentration ranges between about 0.1 to 100 ppm and the $H_2$ concentration ranges between about 0.1 to $1.0\times10^{17}$ molecules/cm³.

8. The synthetic silica glass optical material of claim 7, wherein the OH concentration ranges between about 0.1 to 50 ppm.

9. The synthetic silica glass optical material of claim 8 wherein the $H_2$ concentration ranges between about 0.4 to $1.0\times10^{17}$ molecules/cm³.

10. The synthetic silica glass optical material of claim 1 exhibiting a laser induced wavefront distortion, measured at 633 nm, of between −0.1 and 1.0 nm/cm when subjected to 10 billion pulses of a laser at operating at approximately 193 nm and at a fluence of approximately 70 µJ/cm².

11. The synthetic silica glass optical material of claim 1 exhibiting a laser induced wavefront distortion, measured at 633 nm, of between −0.5 and 0.5 nm/cm when subjected to 10 billion pulses of a laser operating at approximately 193 nm and at a fluence of approximately 40 µJ/cm².

12. The synthetic silica glass optical material of claim 11 exhibiting a laser induced wavefront distortion, measured at 633 nm, of between −0.1 and 0.5 nm/cm when subjected to 10 billion pulses of a laser operating at approximately 193 nm and at a fluence of approximately 40 µJ/cm².

13. A synthetic silica glass optical material for use, and resistant to optical damage, in the wavelength region of less than 250 nm, the synthetic silica glass optical material consisting essentially of synthetic silica glass, $H_2$, and OH, the synthetic silica glass optical material having a $H_2$ concentration ranging between about 0.1 to $5.0\times10^{17}$ molecules/cm³, wherein the synthetic silica glass optical material is loaded with $H_2$ at a temperature of less than about 600° C., an OH concentration less than about 125 ppm, and exhibiting a laser induced wavefront distortion, measured at 633 nm, of between −1.0 to 1.0 nm/cm when subjected to 10 billion pulses of a laser operating at approximately 193 nm and at a fluence of approximately 70 µJ/cm².

14. The synthetic silica glass optical material of claim 13, wherein the $H_2$ concentration ranges between about 0.4 to $5.0\times10^{17}$ molecules/$cm^3$.

15. The synthetic silica glass optical material of claim 14, wherein the $H_2$ concentration ranges between about 0.4 to $2.0\times10^{17}$ molecules/$cm^3$.

16. The synthetic silica glass optical material of claim 13, wherein the OH concentration ranges between about 0.1 to 100 ppm.

17. The synthetic silica glass optical material of claim 13 exhibiting a laser induced wavefront distortion, measured at 633 nm, of between −0.1 and 1.0 nm/cm when subjected to 10 billion pulses of a laser operating at approximately 193 nm operating and at a fluence of approximately 70 μJ/$cm^2$.

18. The synthetic silica glass optical material of claim 13 exhibiting a laser induced wavefront distortion, measured at 633 nm, of between −0.5 and 0.5 nm/cm when subjected to 10 billion pulses of a laser at approximately 193 nm operating at a fluence of approximately 40 μJ/$cm^2$.

19. The synthetic silica glass optical material of claim 18 exhibiting a laser induced wavefront distortion, measured at 633 nm, of between −0.1 and 0.5 nm/cm when subjected to 10 billion pulses of a laser operating at approximately 193 nm operating and at a fluence of approximately 40 μJ/$cm^2$.

20. A synthetic silica glass optical material for use, and resistant to optical damage, in the wavelength region of less than 250 nm, the synthetic silica glass optical material consisting essentially of synthetic silica glass, $H_2$, and OH, the synthetic silica glass optical material having a $H_2$ concentration ranging between about 0.4 to $1.0\times10^{17}$ molecules/$cm^3$, wherein the synthetic silica glass optical material is loaded with $H_2$ at a temperature of less than about 600° C., and an OH concentration less than about 600 ppm, and exhibiting a laser induced wavefront distortion, measured at 633 nm, of between about −1.0 and 1.0 nm/cm when subjected to 10 billion pulses of a laser operating at approximately 193 nm and at a fluence of approximately 70 μJ/$cm^2$.

21. The synthetic silica glass optical material of claim 20, wherein the OH concentration is less than about 200 ppm.

22. The synthetic silica glass optical material of claim 21 exhibiting a laser induced wavefront distortion, measured at 633 nm, of between about −0.1 and 1.0 nm/cm when subjected to 10 billion pulses of a laser operating at approximately 193 nm and at a fluence of approximately 70 μJ/$cm^2$.

23. The synthetic silica glass optical material of claim 20 exhibiting a laser induced wavefront distortion, measured at 633 nm, of between −0.5 and 0.5 nm/cm when subjected to 10 billion pulses of a laser operating at approximately 193 nm and at a fluence of approximately 40 μJ/$cm^2$.

24. The synthetic silica glass optical material of claim 23 exhibiting a laser induced wavefront distortion, measured at 633 nm, of between −0.1 and 0.5 nm/cm when subjected to 10 billion pulses of a laser operating at approximately 193 nm and at a fluence of approximately 40 μJ/$cm^2$.

25. The synthetic silica glass optical material of claim 20, wherein the OH concentration ranges between about 0.1 to 200 ppm.

26. A synthetic silica glass optical material for use, and resistant to optical damage, in the wavelength region of less than 250 nm, the synthetic silica glass optical material consisting essentially of synthetic silica glass, $H_2$, and OH, the synthetic silica glass optical material having a $H_2$ concentration from 0.4 to $1.0\times10^{17}$ molecules/$cm^3$, wherein the synthetic silica glass optical material is loaded with H2 at a temperature of less than about 600° C., and an OH concentration from 100 to about 600 ppm, and exhibiting a laser induced wavefront distortion, measured at 633 nm, of between −1.0 and 1.0 nm/cm when subjected to 10 billion pulses of a laser operating at approximately 193 nm and at a fluence of approximately 70 μJ/$cm^2$.

27. A synthetic silica glass optical material for use, and resistant to optical damage, in the wavelength region of less than 250 nm, the synthetic silica glass optical material consisting essentially of synthetic silica glass, $H_2$, and OH, the synthetic glass optical material having a $H_2$ concentration from 0.1 to $0.5\times10^{17}$ molecules/$cm^3$, wherein the synthetic silica glass optical material is loaded with $H_2$ at a temperature of less than about 600° C., and an OH concentration from 100 to 125 ppm, and exhibiting a laser induced wavefront distortion, measured at 633 nm, of between about −1.0 and 1.0 nm/cm when subjected to 10 billion pulses of a laser at operating approximately 193 nm and at a fluence of approximately 70 μJ/$cm^2$.

28. A method for producing a synthetic silica glass optical material comprising the steps of:
   a) producing a gas stream containing a silicon-containing compound in vapor form capable of being converted through thermal decomposition with oxidation or flame hydrolysis to silica and passing the gas stream into the flame of a combustion burner to form amorphous particles of fused silica soot;
   b) depositing the fused silica soot particles onto a support to form a fused silica soot preform;
   c) consolidating the soot preform into a transparent glass body; and
   d) hydrogen loading the glass body by heating the glass body in the presence of $H_2$-containing gas to a temperature of less than about 600° C., wherein the temperature is sufficient to result in diffusion of $H_2$ into the glass body;
   thereby resulting in a silica glass optical material consisting essentially of synthetic silica glass, $H_2$, and OH, and having a $H_2$ concentration less than about $5.0\times10^{17}$ molecules/$cm^3$, an OH concentration less than about 600 ppm, and exhibiting a laser induced wavefront distortion, measured at 633 nm, of between about −1.0 and 1.0 nm/cm when subjected to 10 billion pulses of a laser operating at approximately 193 nm and at a fluence of approximately 70 μJ/$cm^2$.

29. The method according to claim 28 wherein the glass body has a $H_2$ concentration less than about $2.0\times10^{17}$ molecules/$cm^3$, an OH concentration of less about 200 ppm.

* * * * *

UNITED STATES PATENT AND TRADEMARK OFFICE
CERTIFICATE OF CORRECTION

PATENT NO. : 7,534,733 B2  Page 1 of 1
APPLICATION NO. : 11/064341
DATED : May 19, 2009
INVENTOR(S) : Dana Craig Bookbinder et al.

It is certified that error appears in the above-identified patent and that said Letters Patent is hereby corrected as shown below:

| No. | Col. | Line | Description |
|---|---|---|---|
| 1 | 16 | 3-4 | Reads "optical material is loaded with $H_2$ at temperature of" which should Read "optical material is loaded with $H_2$ at a temperature of" |
| 2 | 16 | 62 | Reads "temperature of less than about 600° C., an OH" which should Read "temperature of less than about 600° C., and an OH" |
| 3 | 18 | 18 | Reads "synthetic glass optical material" which should Read "synthetic silica glass optical material" |
| 4 | 18 | 40 | Reads "$H_2$-containing gas to a tempera-" which should Read "$H_2$-containing gas at a tempera-" |
| 5 | 18 | 55 | Reads "ecules/cm$^3$, an OH concentration" which should Read "ecules/cm$^3$, and an OH concentration" |

Signed and Sealed this

Twenty-first Day of July, 2009

JOHN DOLL
*Acting Director of the United States Patent and Trademark Office*